United States Patent [19]
Bernal

[11] 3,959,548
[45] May 25, 1976

[54] GRADED COMPOSITION COATINGS FOR SURFACE PROTECTION OF HALIDE OPTICAL ELEMENTS

[75] Inventor: Enrique G. Bernal, Minnetonka, Minn.

[73] Assignee: Honeywell Inc., Minneapolis, Minn.

[22] Filed: Oct. 16, 1974

[21] Appl. No.: 515,139

[52] U.S. Cl. .................. 428/212; 252/300; 350/2; 427/162; 428/522
[51] Int. Cl.² .............. B32B 7/02; G02B 1/00
[58] Field of Search ........... 161/256; 428/212, 522; 117/33.3, 69, 121; 252/300; 350/1, 2, 164, 165; 427/162

[56] References Cited
UNITED STATES PATENTS

| | | | |
|---|---|---|---|
| 2,561,077 | 7/1951 | Tilton | 350/164 |
| 2,668,478 | 2/1954 | Schroder | 350/2 |
| 3,151,208 | 9/1964 | Alpert | 350/1 |
| 3,733,217 | 5/1973 | Seely et al. | 117/33.3 |

OTHER PUBLICATIONS

*Concepts of Classical Optics*, John Strong, W. H. Freeman and Company, 1958, pp. 247-252.

Primary Examiner—Marion E. McCamish
Assistant Examiner—P. J. Thibodeau
Attorney, Agent, or Firm—David R. Fairbairn

[57] ABSTRACT

Optical elements formed from water soluble halides are protected by a protective layer. The protective layer has a graded composition which varies from that of the water soluble halide to that of another material which is insoluble in water.

5 Claims, 2 Drawing Figures

GRADED COMPOSITION COATINGS FOR SURFACE PROTECTION OF HALIDE OPTICAL ELEMENTS

ORIGIN OF THE INVENTION

The present invention was made under a contract with the Department of Defense.

REFERENCE TO CO-PENDING APPLICATIONS

Reference is made to a co-pending application Ser. No. 515,140 by J. H. Chaffin III, entitled "Preparation of Graded Composition Protective Coatings", which was filed on even date (Oct. 16, 1974) with this application, and which is assigned to the same assignee as this application.

BACKGROUND OF THE INVENTION

This invention is concerned with surface protection of halide solids. In particular, the present invention is concerned with the surface protection of water soluble halide solids for use as optical components in infrared systems.

One of the more critical problems encountered in the development of high power infrared lasers is the development of laser windows which are highly transparent to laser radiation at 10.6 microns and at 3 to 5 microns. At the present time, considerable research effort has been devoted to the development of laser windows from the so called covalent compounds consisting typically of II–VI compounds such as cadmium telluride, zinc telluride, and zinc selenide. The need for improved laser window materials, however, is well known. F. Horrigan et al., "Windows for High Power Lasers" *Microwaves*, page 68 (January, 1969); M. Sparks, "Optical Distortion by Heated Windows in High Power Laser Systems", *J. Appl. Phys.*, 42, 5029 (1971).

The need for improved laser windows is based on the extremely high laser power throughput required and the fact that laser windows constitute structural members. In order to maintain high throughput and minimize adverse effects, the amount of energy transferred to the window must be kept low. Laser beam energy can be transferred to the window in two ways: heating of the window caused by either bulk or surface absorption of the beam, or direct conversion of the beam energy to mechanical energy by brillouin scattering or electrostriction. This energy transfer produces several undesirable effects such as lensing and birefringence, which result in degradation of beam quality and polarization. In extreme cases, severe thermal stresses can be produced in the windows. These stresses, which are further aggravated by the fact that the windows are mounted in a cooling clamp, may lead to fracture of the windows.

The low absorption coefficients of the halides make them outstanding candidates for optical components in infrared systems. The alkali halides exhibit low absorption at 10.6 microns, and the alkaline earth halides exhibit low absorption in the 2 to 6 micron region. Furthermore, because the temperature coefficient of the index of refraction and the coefficient of thermal expansion have opposite signs, the two effects tend to compensate optical path changes due to temperature, making these materials useful in applications in which heating by a laser beam is anticipated.

Two fundamental problems with the halides, however, have precluded their use as high power laser windows. First, halide crystals have low yield strengths and are highly susceptible to fracture. Second, many halides, in particular the alkali halides, have the undesirable property of being water soluble and cannot, therefore, be used in humid environments.

The first problem has recently been overcome. Techniques for strengthening halides by hot working without altering their optical properties have been developed. These techniques are described in U.S. patent applications Ser. No. 445,371 by R. H. Anderson, now abandoned, Ser. No. 619,264, which is a continuation of Ser. No. 445,394 by B. G. Koepke, and Ser. No. 617,350, which is a continuation of Ser. No. 445,393 by E. Bernal G. et al., now abandoned. These patent applications are assigned to the same assignee as this application.

Despite extensive research efforts, the second problem, surface protection, has not previously been overcome. Conventional coating methods for sealing the surface of the halide solid from environmental humidity have generally failed for one of two reasons. First, the coatings lose their integrity during thermal cycling because of differences of coefficient of thermal expansion between the coating material and the substrate. This is a serious problem because the large coefficient of thermal expansion of halides tends to result in coatings that are in tension. It has not been uncommon for the protective coating to peel off of a halide window during use. Second, the coating material is sufficiently opaque in the infrared to negate the extremely low optical loss which makes the halides attractive.

SUMMARY OF THE INVENTION

The present invention provides a protective layer for halide optical elements which overcomes the shortcomings of prior protective coatings. The protective layer comprises an alloy of the first, water soluble, halide material and a second material which is essentially insoluble in water. The composition of the protective layer varies from essentially the first halide material at the interface of the protective layer and the body to be protected, to the second material at the opposite surface of the protective layer.

DETAILED DESCRIPTION OF THE PREFERRED EMBODIMENTS

In the present invention, a water soluble halide body or substrate is coated with a protective layer having low water solubility, low optical loss, and a reasonable degree of structural compatibility with the substrate. The protective layer has a composition which varies in an essentially continuous manner from that of the substrate material to that of a water insoluble second material.

In addition to being water insoluble, the second material should preferably have the following characteristics. First, the second material and the substrate material should be capable of forming a continuous series of solid solutions. Second, the absorption coefficient of the second material in the wavelength region of interest should be no higher than about 1,000 times the absorption coefficient of the halide material forming the substrate. Third, the coefficient of thermal expansion of the second material should differ from that of the substrate material by less than about 20 percent.

When the substrate material is an alkali halide such as KCl or NaCl or an alloy of alkali halides such as KCl-KBr or KCl-RbCl, and the wavelength region of interest is approximately 10.6 microns, there are several potential candidates for the second material. Among these materials are thallium iodide (TlI), cuprous iodide (CuI), bromo- and chloro-platinates such as $K_2PtCl_6$, $K_2PtBr_6$, and $Rb_2PtCl_6$, other potassium compounds such as $K_2SiF_6$, silver halides, and mercury halides.

Thallium iodide (TlI) is a particularly advantageous material for use in the present invention. TlI films have been prepared to have an absorption coefficient of less than 1 $cm^{-1}$ at a wavelength of 10.6 microns. Experiments have shown that TlI films will provide adequate moisture protection to serve as protective coatings for alkali halides. In one experiment, a 2,000A thick TlI film on a glass substrate was exposed for 450 hours to a 100 percent relative humidity environment. No visible changes in the film were detected.

For simplicity, further description of the present invention will be made in terms of a KCl substrate with a KCl-TlI alloy protective layer. It should be understood, however, that analogous arrangements can be made when the substrate is either a different halide or a halide alloy, and when a protective material other than thallium iodide is used.

Figure 1:
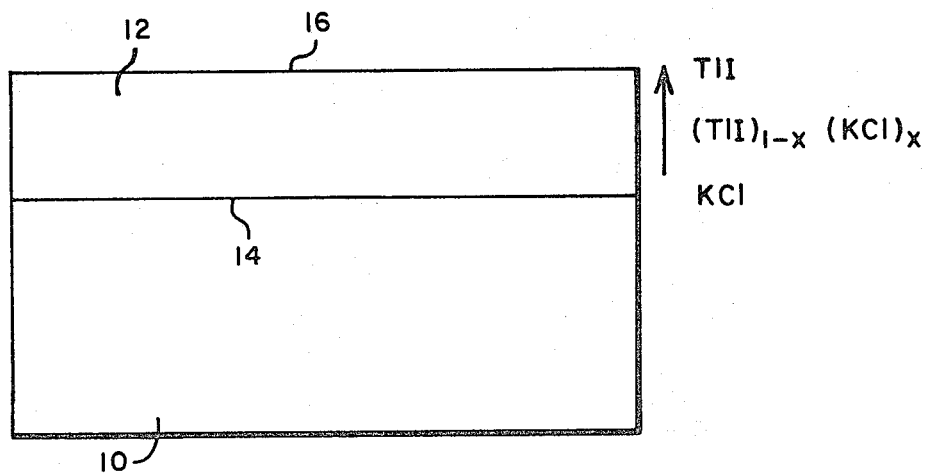
FIG. 1 diagrammatically shows the protective layer of the present invention.

FIG. 1 illustrates the present invention. KCl substrate 10 is covered by a protective layer 12. The composition of protective layer 12 varies from essentially KCl at interface 14 to essentially pure TlI at outer surface 16.

The composition of protective layer 12 is continuously varying between interface 14 and surface 17. The composition at a particular point in the thickness of layer 12 may be described by the formula $(TlI)_{1-x}(KCl)_x$, where x is the mole fraction of KCl. At interface 14, x is approximately equal to 1, and at surface 16, x is approximately zero. In between, x is continuously decreasing with distance from interface 14.

The continuous compositional transition within the protective layer overcomes the problems encountered with prior art coatings. The prior art protective layers provided a discrete interface because of the difference in composition between the substrate and the coating. It was at this discrete interface that cracking would occur due to thermal cycling. The continuously varying composition of the present invention, on the other hand, guarantees that the protective layer will be structurally stable and that it will be able to withstand thermal cycling without cracking.

Graded composition TlI-KCl protective layers have been prepared on KCl substrates by vapor deposition. KCl and TlI were co-deposited from two independently heated crucibles. The deposition rate versus crucible heater current for the TlI crucible and for the KCl crucible were first determined. The two independent crucible heater currents were then manipulated during deposition. KCl alone was first deposited onto a cleaved single crystal KCl substrate at room temperature. After a period of time, the KCl deposition was reduced to zero. During this transition interval the TlI deposition was smoothly increased for its predetermined steady state value and maintained for the remainder of the run.

Initial films prepared by this method exhibited absorption coefficients at 10.6 microns of about 25 $cm^{-1}$. This was higher than for pure TlI films discretely deposited on KCl, which exhibited absorption coefficients of less than 1 $cm^{-1}$ at 10.6 microns.

This problem of higher absorption in an alloy film was determined to be due to a halogen deficiency in the alloyed region of the protective layer. This halogen deficiency was apparently due to the difference in temperature between the relatively hot (475°C) KCl vapor condensing at the same time as the relatively cool (150°) TlI vapor. The KCl vapor apparently was causing the TlI to decompose.

This problem was overcome by the technique described in the previously mentioned co-pending patent application Ser. No. 515,140 by J. H. chaffin III entitled "Preparation of Graded Composition Protective Coatings". The KCl and TlI were deposited in an inert argon atmosphere of about $4 \times 10^{-4}$ Torr. The effective vapor temperature of each vapor species was cooled by multiple collisions with the inert gas, thereby reducing or eliminating the decomposition problem. In addition, more uniform films were obtained because the collisions randomized the direction of vapor deposition.

Figure 2:
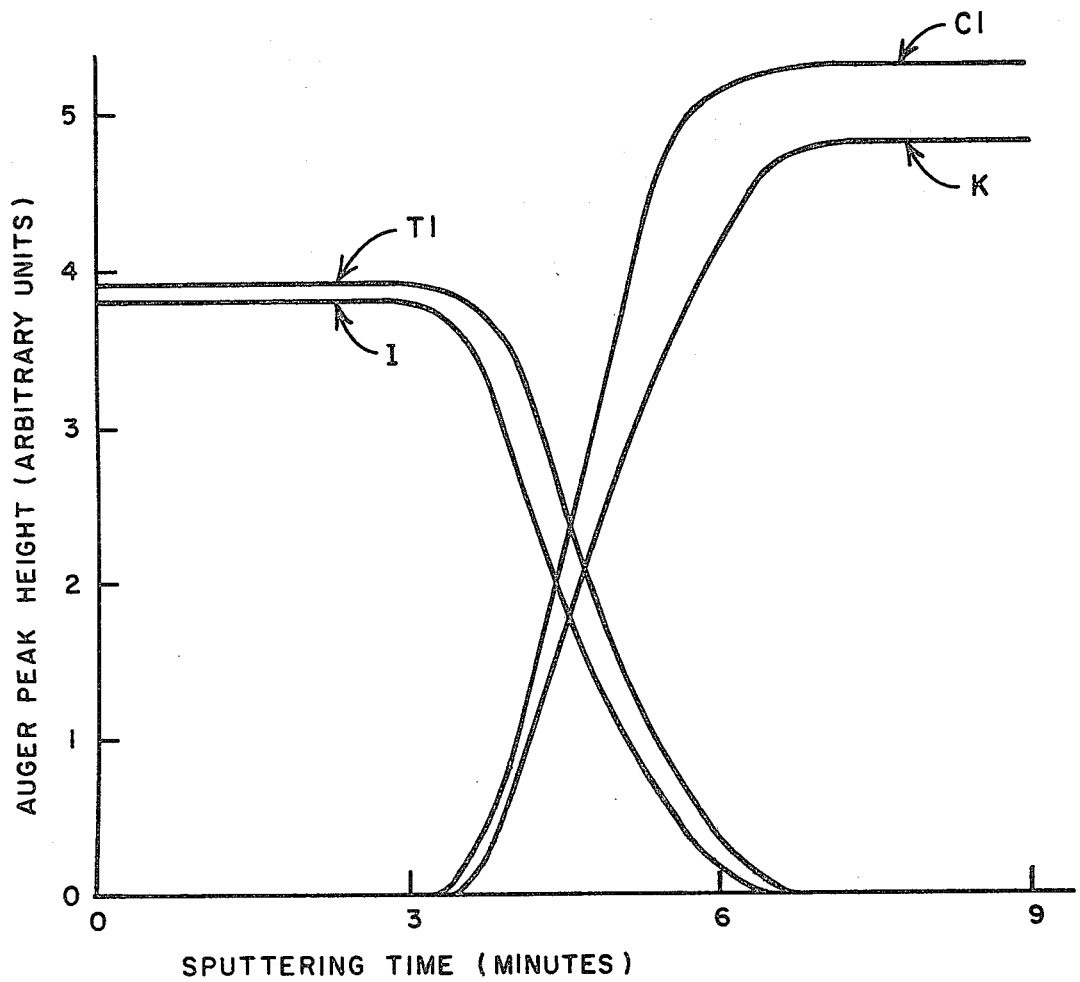
FIG. 2 shows composition as a function of thickness for a protective layer of the present invention.

FIG. 2 shows composition as a function of distance from the outer surface of the protective layer as measured by Auger electron spectroscopy. Composition is shown in terms of Auger peak height, and distance from the outer surface is shown in terms of sputtering time. It can be seen that the composition of the protective layer varies from pure TlI at the outer surface to pure KCl at the substrate. The transition in composition is relatively uniform as a function of distance.

In conclusion, the problem of providing a protective coating for halide optical elements has been overcome by the present invention. Both low optical absorption and structural stability have been achieved by use of graded composition protective layers.

Although the present invention has been described with reference to a series of preferred embodiments, skilled workers will recognize that modifications and changes can be made without departing from the spirit and scope of the present invention. For example, although halide laser windows have been specifically described as an application for the present invention, it will be recognized that the present invention may be used for protective coatings for other halide optical elements, such as lenses, as well.

The embodiments of the invention in which an exclusive property or right is claimed are defined as follows:
1. An optical element comprising:
   a body of essentially a first halide material, the first halide material having the undesirable property of being soluble in water;
   a protective layer covering a surface of the body, the protective layer comprising an alloy of the first halide material and a second halide material which is essentially insoluble in water, the composition of the protective layer varying from essentially the first halide material at the interface of the body and the protective layer to essentially the second halide material at an opposite surface of the protective layer;
   wherein the second halide material has an absorption coefficient which is less than about 1,000 times the absorption coefficient of the first halide material in a wavelength region of interest; and wherein the second halide material has a coefficient of thermal expansion which differs from the coefficient of thermal expansion of the first halide material by less than about 20 percent.

2. The optical element of claim 1 wherein the first halide material and the second halide material form a continuous series of solid solutions.

3. The optical element of claim 1 wherein the second halide material is thallium iodide.

4. The optical element of claim 1 wherein the first halide material is of the group consisting of alkali halides and alloys thereof.

5. The optical element of claim 4 wherein the second halide material is thallium iodide.

* * * * *

UNITED STATES PATENT OFFICE
CERTIFICATE OF CORRECTION

PATENT NO. : 3,959,548

DATED : May 25, 1976

INVENTOR(S) : ENRIQUE BERNAL G.

It is certified that error appears in the above--identified patent and that said Letters Patent are hereby corrected as shown below:

Line [75] on Abstract page should read as follows:

[75] Inventor: Enrique Bernal G., Minnetonka, Minn.

Signed and Sealed this

Thirty-first Day of August 1976

[SEAL]

Attest:

RUTH C. MASON
Attesting Officer

C. MARSHALL DANN
Commissioner of Patents and Trademarks